United States Patent
Bi

(10) Patent No.: US 9,432,619 B2
(45) Date of Patent: *Aug. 30, 2016

(54) METHOD AND APPARATUS FOR COMMUNICATIONS

(71) Applicant: AT&T Intellectual Property I, LP, Atlanta, GA (US)

(72) Inventor: Haifeng Bi, San Antonio, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/205,663

(22) Filed: Mar. 12, 2014

(65) Prior Publication Data

US 2014/0208376 A1    Jul. 24, 2014

Related U.S. Application Data

(63) Continuation of application No. 12/352,958, filed on Jan. 13, 2009, now Pat. No. 8,711,199.

(51) Int. Cl.

| H04N 7/14 | (2006.01) |
|---|---|
| H04N 5/76 | (2006.01) |
| H04N 21/422 | (2011.01) |
| H04N 21/4223 | (2011.01) |
| H04N 21/432 | (2011.01) |
| H04N 21/433 | (2011.01) |
| H04N 21/443 | (2011.01) |
| H04N 21/4788 | (2011.01) |
| H04N 21/81 | (2011.01) |
| H04N 21/488 | (2011.01) |

(52) U.S. Cl.
CPC ............... *H04N 7/147* (2013.01); *H04N 5/76* (2013.01); *H04N 21/4223* (2013.01); *H04N 21/42203* (2013.01); *H04N 21/4325* (2013.01); *H04N 21/4334* (2013.01); *H04N 21/443* (2013.01); *H04N 21/4788* (2013.01); *H04N 21/488* (2013.01); *H04N 21/8166* (2013.01)

(58) Field of Classification Search
USPC .......................................... 348/14
See application file for complete search history.

(56) References Cited

U.S. PATENT DOCUMENTS

| 4,799,156 A * | 1/1989 | Shavit .................. G06Q 10/087 705/26.3 |
|---|---|---|
| 6,812,956 B2 | 11/2004 | Ferren |
| 7,380,260 B1 | 5/2008 | Billmaier |
| 2003/0043260 A1 | 3/2003 | Yap |
| 2004/0010808 A1 | 1/2004 | DeCarmo |
| 2005/0038326 A1* | 2/2005 | Mathur .................. A61B 5/411 600/300 |
| 2006/0159099 A1 | 7/2006 | Hensley |
| 2007/0009113 A1 | 1/2007 | Kenoyer |
| 2007/0139514 A1 | 6/2007 | Marley |
| 2007/0180485 A1 | 8/2007 | Dua |

(Continued)

*Primary Examiner* — Joseph J Nguyen
(74) *Attorney, Agent, or Firm* — Guntin & Gust; Robert Gingher

(57) ABSTRACT

A system that incorporates teachings of the present disclosure may include, for example, a set-top-box (STB) having a controller to operate the STB coupled to an interactive television network as an audio visual answering machine using a digital video recorder forming a part of the STB, use at least one camera coupled to the STB to capture video, use at least one microphone coupled to the STB to capture audio, present video from at least a calling party on a television set coupled to the STB, and present audio from at least the calling party on speakers coupled to the STB. Other embodiments are disclosed.

20 Claims, 6 Drawing Sheets

(56) References Cited

U.S. PATENT DOCUMENTS

| | | |
|---|---|---|
| 2007/0183401 A1 | 8/2007 | Bennett |
| 2007/0291736 A1 | 12/2007 | Furlong |
| 2007/0294726 A1 | 12/2007 | Drazin |
| 2008/0022322 A1 | 1/2008 | Grannan |
| 2008/0178225 A1 | 7/2008 | Jost |
| 2009/0003540 A1 | 1/2009 | Zafar |
| 2009/0015651 A1 | 1/2009 | Togami et al. |
| 2009/0025028 A1 | 1/2009 | Cassanova |
| 2009/0060152 A1 | 3/2009 | Alexander |
| 2010/0162296 A1 | 6/2010 | Donzis et al. |
| 2010/0171806 A1 | 7/2010 | Matsuda |

* cited by examiner

600

METHOD AND APPARATUS FOR COMMUNICATIONS

CROSS-REFERENCE TO RELATED APPLICATIONS

This application is a continuation of U.S. patent application Ser. No. 12/352,958 filed Jan. 13, 2009 which is incorporated herein by reference in its entirety.

FIELD OF THE DISCLOSURE

The present disclosure relates generally to communication techniques and more specifically to a method and apparatus for communications.

BACKGROUND

A digital videophone answering device (DVAD) utilizes the functionality of a device such as a set top box (STB) equipped with a digital video recorder (DVR) operating in a unidirectional TV broadcast system. The DVAD is operatively connected to or integral with an STB equipped with DVR functionality.

DETAILED DESCRIPTION

One embodiment of the present disclosure can entail a method in a Set-Top-Box (STB) comprising engaging in multimedia conferencing using Voice-over-IP (VoIP) and video over an interactive television (iTV) network and instructing a digital video recording (DVR) device to serve as a multimedia mailbox or answering machine for playing a multimedia greeting message from the STB and for recording multimedia calls made to the STB through the iTV network.

Another embodiment of the present disclosure can entail a method in a media processor for engaging a multimedia conference using VoIP and iTV services of an iTV network, wherein the media processor has a DVR coupled to at least one camera and a microphone.

Yet another embodiment of the present disclosure can entail a computer-readable storage medium operating in a media processor having computer instructions to detect a multimedia conference call using VoIP and iTV services, record the multimedia conference call, and activate a message waiting indicator on the media processor when a message is recorded.

Yet another embodiment of the present disclosure can entail an STB having a controller to operate the STB coupled to an iTV network as an audio visual answering machine using a DVR operably coupled to the STB, use at least one camera coupled to the STB to capture video, use at least one microphone coupled to the STB to capture audio, present video from at least a calling party on a television set coupled to the STB, and present audio from at least the calling party on speakers coupled to the STB.

Figure 1:
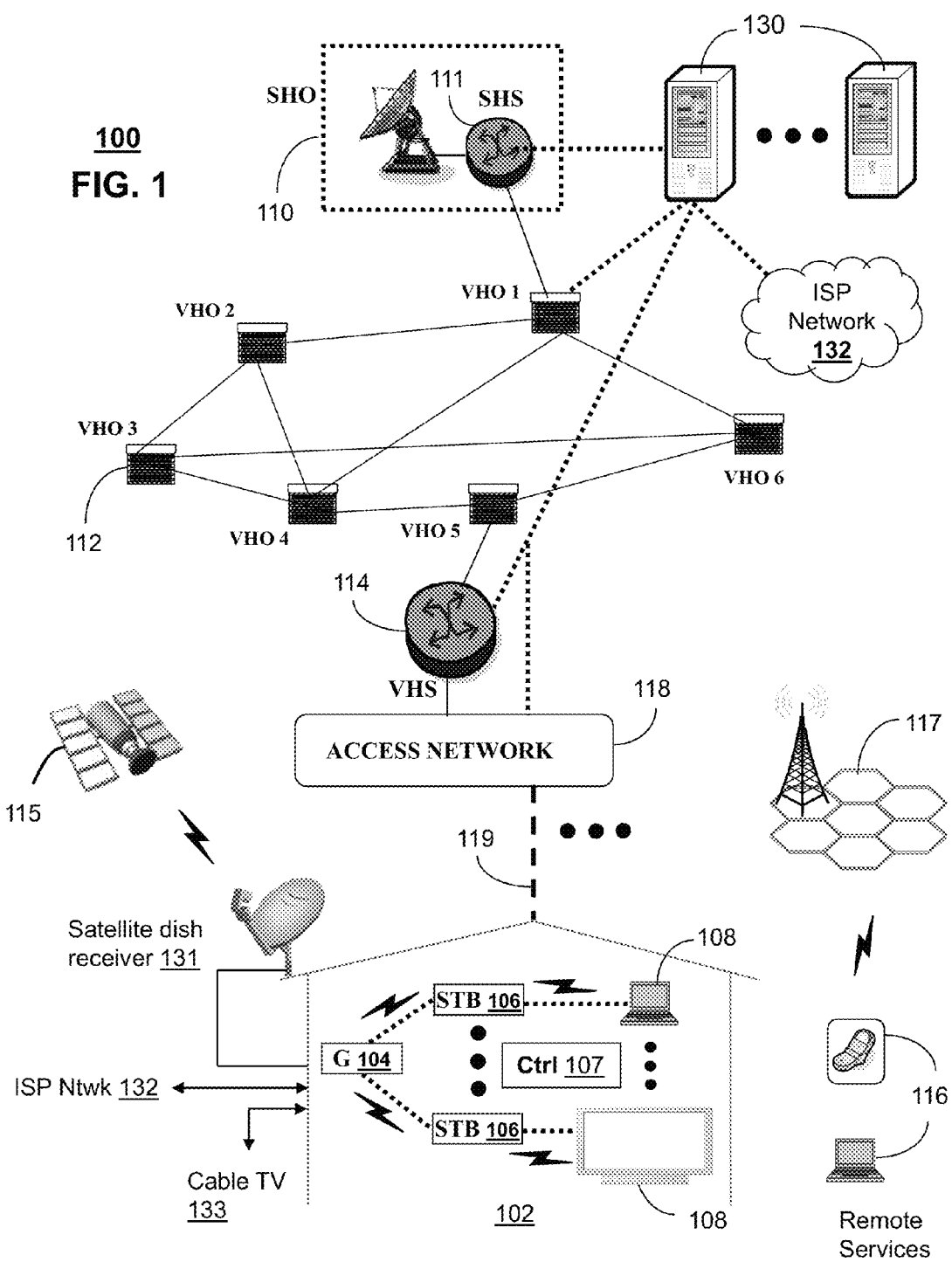
FIG. 1 depicts an illustrative embodiment of a communication system.

FIG. 1 depicts an illustrative embodiment of a first communication system 100 for delivering media content. The communication system 100 can represent an Internet Protocol Television (IPTV) broadcast media system. The IPTV media system can include a super head-end office (SHO) 110 with at least one super headend office server (SHS) 111 which receives media content from satellite and/or terrestrial communication systems. In the present context, media content can represent audio content, moving image content such as videos, still image content, or combinations thereof. The SHS server 111 can forward packets associated with the media content to video head-end servers (VHS) 114 via a network of video head-end offices (VHO) 112 according to a common multicast communication protocol.

The VHS 114 can distribute multimedia broadcast programs via an access network 118 to commercial and/or residential buildings 102 housing a gateway 104 (such as a common residential or commercial gateway). The access network 118 can represent a group of digital subscriber line access multiplexers (DSLAMs) located in a central office or a service area interface that provide broadband services over optical links or copper twisted pairs 119 to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote control).

The gateway 104, the media processors 106, and media devices 108 can utilize tethered interface technologies (such as coaxial or phone line wiring) or can operate over a common wireless access protocol. With these interfaces, unicast communications can be invoked between the media processors 106 and subsystems of the IPTV media system for services such as video-on-demand (VoD), browsing an electronic programming guide (EPG), or other infrastructure services.

Some of the network elements of the IPTV media system can be coupled to one or more computing devices 130 a portion of which can operate as a web server for providing portal services over an Internet Service Provider (ISP) network 132 to wireline media devices 108 or wireless communication devices 116 by way of a wireless access base station 117 operating according to common wireless access protocols such as Wireless Fidelity (WiFi), or cellular communication technologies (such as GSM, CDMA, UMTS, WiMAX, Software Defined Radio or SDR, and so on).

It will be appreciated by an artisan of ordinary skill in the art that a satellite broadcast television system can be used in place of the IPTV media system. In this embodiment, signals transmitted by a satellite 115 supplying media content can be intercepted by a common satellite dish receiver 131 coupled to the building 102. Modulated signals intercepted by the satellite dish receiver 131 can be submitted to the media processors 106 for generating broadcast channels which can be presented at the media devices 108. The media processors 106 can be equipped with a broadband port to the ISP network 132 to enable infrastructure services such as VoD and EPG described above.

In yet another embodiment, an analog or digital broadcast distribution system such as cable TV system 133 can be used in place of the IPTV media system described above. In this embodiment the cable TV system 133 can provide Internet, telephony, and interactive media services.

It follows from the above illustrations that the present disclosure can apply to any present or future interactive over-the-air or landline media content services.

Figure 2:
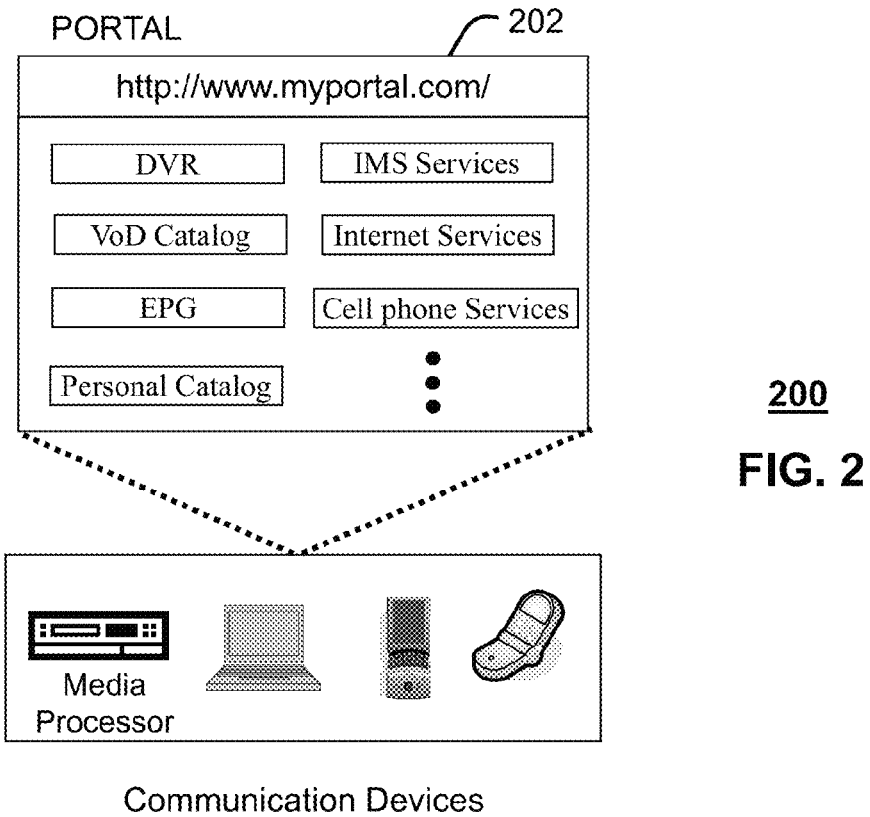
FIG. 2 depicts an illustrative embodiment of a portal interacting with the communication system of FIG. 1.

FIG. 2 depicts an illustrative embodiment of a portal 202 which can operate from the computing devices 130 described earlier of communication 100 illustrated in FIG. 1. The portal 202 can be used for managing services of communication systems 100-200. The portal 202 can be accessed by a Uniform Resource Locator (URL) with a common Internet browser such as Microsoft's Internet Explorer™ using an Internet-capable communication device such as those described for FIGS. 1-2. The portal 202 can be configured, for example, to access a media processor 106 and services managed thereby such as a Digital Video Recorder (DVR), a VoD catalog, an EPG, a personal catalog (such as personal videos, pictures, audio recordings, etc.) stored in the media processor, provisioning IMS services described earlier, provisioning Internet services, provisioning cellular phone services, and so on.

Figure 3:
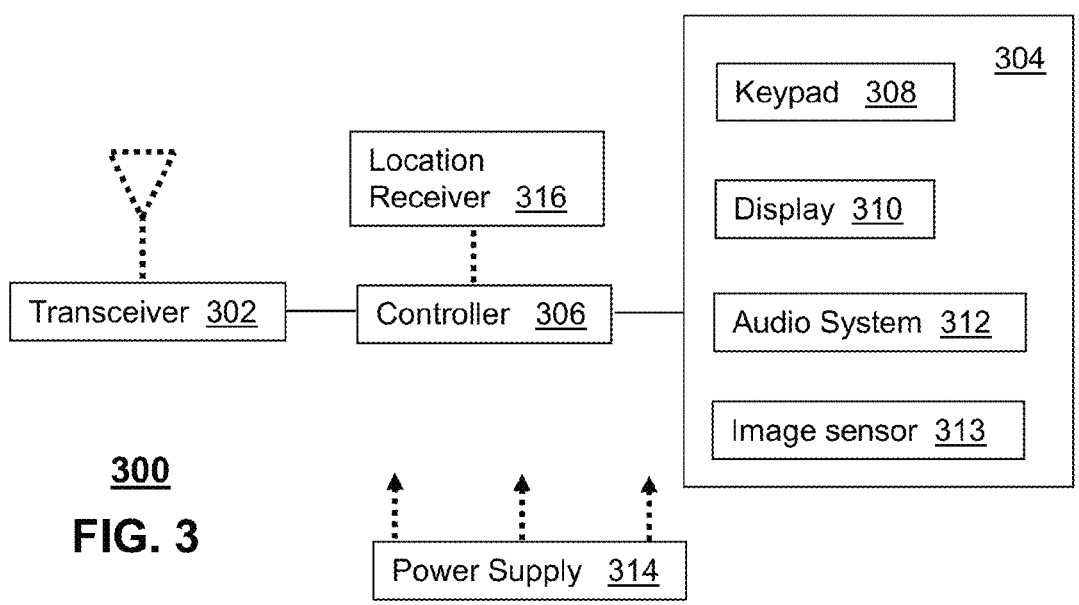
FIG. 3 depicts an illustrative embodiment of a communication device utilized in the communication system of FIG. 1.

FIG. 3 depicts an exemplary embodiment of a communication device 300. Communication 300 can serve in whole or in part as an illustrative embodiment of the communication devices of FIGS. 1-2. The communication device 300 can comprise a wireline and/or wireless transceiver 302 (herein transceiver 302), a user interface (UI) 304, a power supply 314, a location receiver 316, and a controller 306 for managing operations thereof. The transceiver 302 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, SDR, and next generation cellular wireless communication technologies as they arise. The transceiver 302 can also be adapted to support circuit-switched wireline access technologies (such as PSTN), packet-switched wireline access technologies (such as TCPIP, VoIP, etc.), and combinations thereof.

The UI 304 can include a depressible or touch-sensitive keypad 308 with a navigation mechanism such as a roller ball, joystick, mouse, or navigation disk for manipulating operations of the communication device 300. The keypad 308 can be an integral part of a housing assembly of the communication device 300 or an independent device operably coupled thereto by a tethered wireline interface (such as a USB cable) or a wireless interface supporting for example Bluetooth. The keypad 308 can represent a numeric dialing keypad commonly used by phones, and/or a Qwerty keypad with alphanumeric keys. The UI 304 can further include a display 310 such as monochrome or color LCD (Liquid Crystal Display), OLED (Organic Light Emitting Diode) or other suitable display technology for conveying images to an end user of the communication device 300. In an embodiment where the display 310 is touch-sensitive, a portion or all of the keypad 308 can be presented by way of the display.

The UI 304 can also include an audio system 312 that utilizes common audio technology for conveying low volume audio (such as audio heard only in the proximity of a human ear) and high volume audio (such as speakerphone for hands free operation). The audio system 312 can further include a microphone for receiving audible signals of an end user. The audio system 412 can also be used for voice recognition applications. The UI 304 can further include an image sensor 313 such as a charged coupled device (CCD) camera for capturing still or moving images.

The power supply 314 can utilize common power management technologies such as replaceable and rechargeable batteries, supply regulation technologies, and charging system technologies for supplying energy to the components of the communication device 300 to facilitate long-range or short-range portable applications. The location receiver 316 can utilize common location technology such as a global positioning system (GPS) receiver for identifying a location of the communication device 300 based on signals generated by a constellation of GPS satellites, thereby facilitating common location services such as navigation.

The communication device 300 can use the transceiver 302 to also determine a proximity to a cellular, WiFi or Bluetooth access point by common power sensing techniques such as utilizing a received signal strength indicator (RSSI) and/or a signal time of arrival (TOA) or time of flight (TOF). The controller 306 can utilize computing technologies such as a microprocessor, a digital signal processor (DSP), and/or a video processor with associated storage memory such a Flash, ROM, RAM, SRAM, DRAM or other storage technologies.

The communication device 300 can be adapted to perform the functions of the media processor 106, the media devices 108, or the portable communication devices 116 of FIG. 1. It will be appreciated that the communication device 300 can also represent other common devices that can operate in communication systems 100 of FIG. 1 such as a gaming console and a media player.

Figure 4:
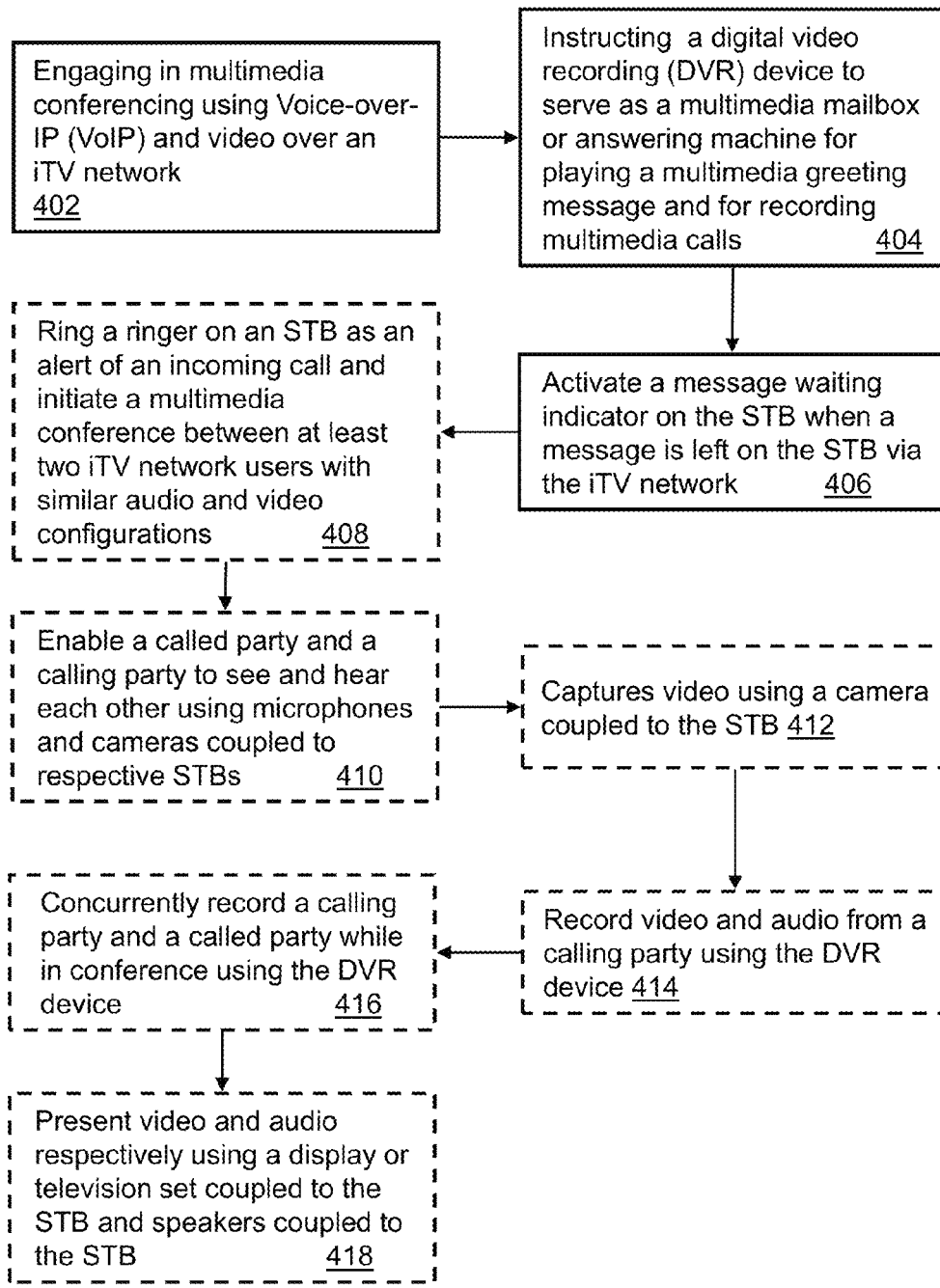
FIG. 4 depicts an illustrative embodiment of a method operating in portions of the communication system of FIG. 1.

FIG. 4 depicts an illustrative method 400 that operates in portions of the communication system of FIG. 1. Method 400 can begin with step 402 in which multimedia conferencing uses Voice-over-IP (VoIP) and video over an iTV network. The method at 404 can use a set-top-box (STB) such as an enhanced STB having a digital video recording (DVR) device therein to serve as a multimedia mailbox or answering machine for playing a multimedia greeting message from the STB and for recording multimedia calls made to the STB through the iTV network. Once a message is left on the STB via the iTV network, a message waiting indicator on the STB can be activated at 406. Also, the STB can include a ringer that servers to provide an alert at 408 of an incoming call and multimedia conferencing is initiated between two iTV network users with similar audio and video configurations.

The method 400 at 410 can enable a called party and a calling party to see and hear each other using microphones and cameras coupled to respective STBs belonging to the called party and the calling party. Video can be captured at 412 using a camera coupled to the STB. Video and audio from a calling party using the DVR device can be recorded at 414. The method at 416 can concurrently record a calling party and a called party while in conference using the DVR device. The method can also present video and audio respectively using a display or television set coupled to the STB and speakers coupled to the STB at 418.

Upon reviewing the aforementioned embodiments, it would be evident to an artisan with ordinary skill in the art that said embodiments can be modified, reduced, or enhanced without departing from the scope and spirit of the claims described below. For example, the iTV services can operate in one of an Internet Protocol TV system, a cable TV system, and a satellite TV system.

Other suitable modifications can be applied to the present disclosure without departing from the scope of the claims below. Accordingly, the reader is directed to the claims section for a fuller understanding of the breadth and scope of the present disclosure.

Figure 5:
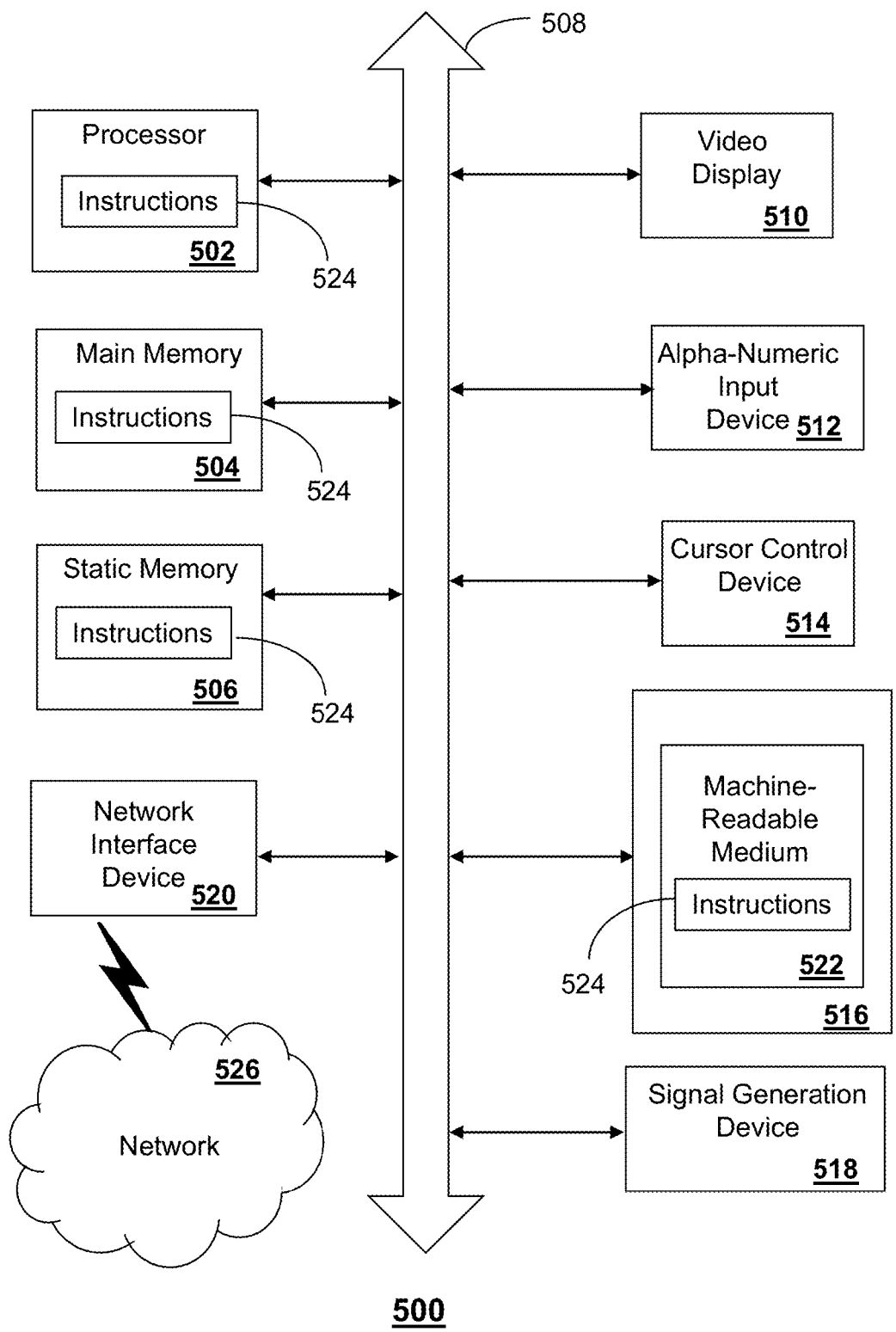
FIG. 5 is a diagrammatic representation of a machine in the form of a computer system within which a set of instructions, when executed, may cause the machine to perform any one or more of the methodologies discussed herein

FIG. 5 depicts an exemplary diagrammatic representation of a machine in the form of a computer system 500 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 500 may include a processor 502 (e.g., a central processing unit (CPU), a graphics processing unit (GPU, or both), a main memory 504 and a static memory 506, which communicate with each other via a bus 508. The computer system 500 may further include a video display unit 510 (e.g., a liquid crystal display (LCD), a flat panel, a solid state display, or a cathode ray tube (CRT)). The computer system 500 may include an input device 512 (e.g., a keyboard), a cursor control device 514 (e.g., a mouse), a disk drive unit 516, a signal generation device 518 (e.g., a speaker or remote control) and a network interface device 520.

The disk drive unit 516 may include a machine-readable medium 522 on which is stored one or more sets of instructions (e.g., software 524) embodying any one or more of the methodologies or functions described herein, including those methods illustrated above. The instructions 524 may also reside, completely or at least partially, within the main memory 504, the static memory 506, and/or within the processor 502 during execution thereof by the computer system 500. The main memory 504 and the processor 502 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 524, or that which receives and executes instructions 524 from a propagated signal so that a device connected to a network environment 526 can send or receive voice, video or data, and to communicate over the network 526 using the instructions 524. The instructions 524 may further be transmitted or received over a network 526 via the network interface device 520.

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

Figure 6:
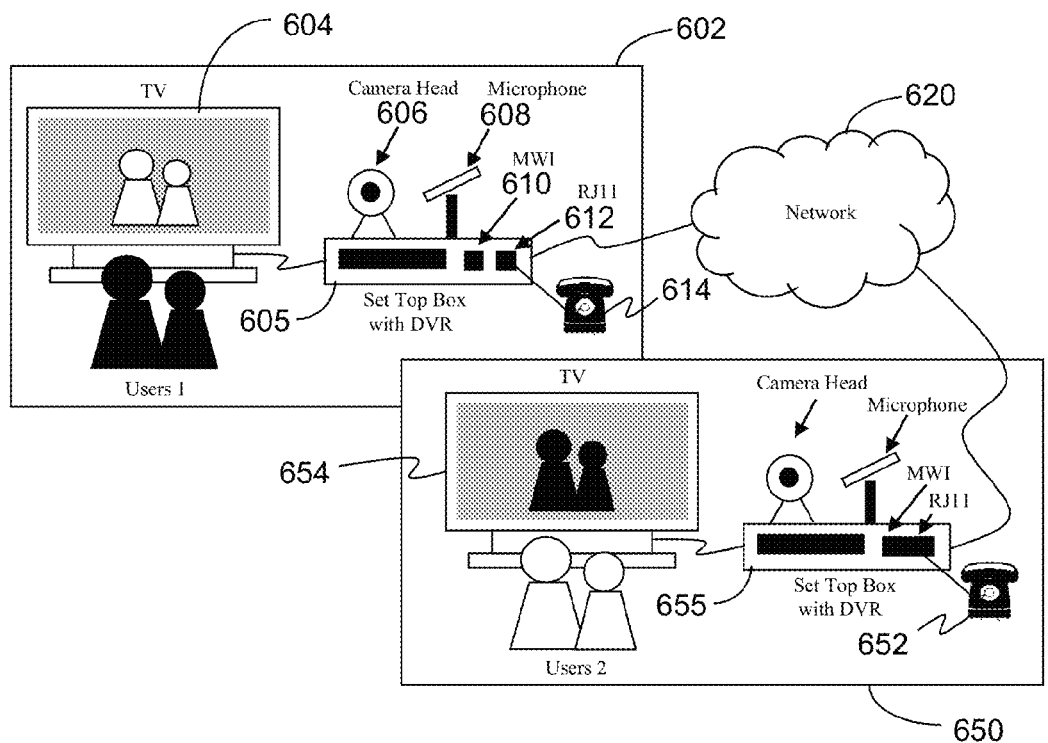
FIG. 6 depicts another communication system illustrative of the embodiments herein.

Referring to FIG. 6, similarly configured systems 602 and 650 for both a calling party (Users 1) and a called party (Users 2) respectively are illustrated in a iTV or IPTV communication system 600. The systems 602 and 650 can each have respective enhanced STBs 605 and 655 each having respective DVRs and camera heads 606, microphones 608, and message waiting indicator (MWI) 610. Each STB can also include an optional telephone jack 612 where an optional telephone or cordless phone base station 614 or 652 can be coupled to the jack 612. The systems also include respective displays or television sets 604 and 654 coupled to the respect STBs 605 and 655. The two systems 602 and 650 can be coupled to each other over a network 620 such as an iTV, IPTV or other network.

Operationally, VoIP and video calls are conducted directly on the system 600 using IPTV with the DVRs serving as respective mailboxes. As noted above, an enhance or modified set top box can include a camera head (if built-in) or an receptacle for a camera if a camera is to be externally connected, a microphone (if built-in) or a receptacle if microphone is to be externally connected, a ringer, a message waiting indicator (MWI) and an optional RJ11 jack for connecting a regular phone (or an embedded cordless base station if a cordless phone if preferred). In an alternative embodiment, a cordless base station can be embedded into the STB. An audio/video call can be initiated between two similarly configured systems having similar audio and video capabilities. When such a call is initiated, a ringer on the receiving end STB can alert of an incoming call. When connected, the users or customers can see each other on the respective IPTV television sets 604 and 654, and hear each other via the speakers on or attached to the TV or otherwise coupled to the STBs. The call can also be picked up using the optionally attached phone 614 or 652 (or respective cordless phone base and cordless phone (not shown)) so as to keep the conversation more private. The video is captured by the camera head built-in or connected to the set top box.

The audio is captured by the microphone built-in or connected to the set top box. It is also possible to record both audio and video of an audio/video call in real time onto the DVR (digital video recorder) for later re-play.

Figure 7:
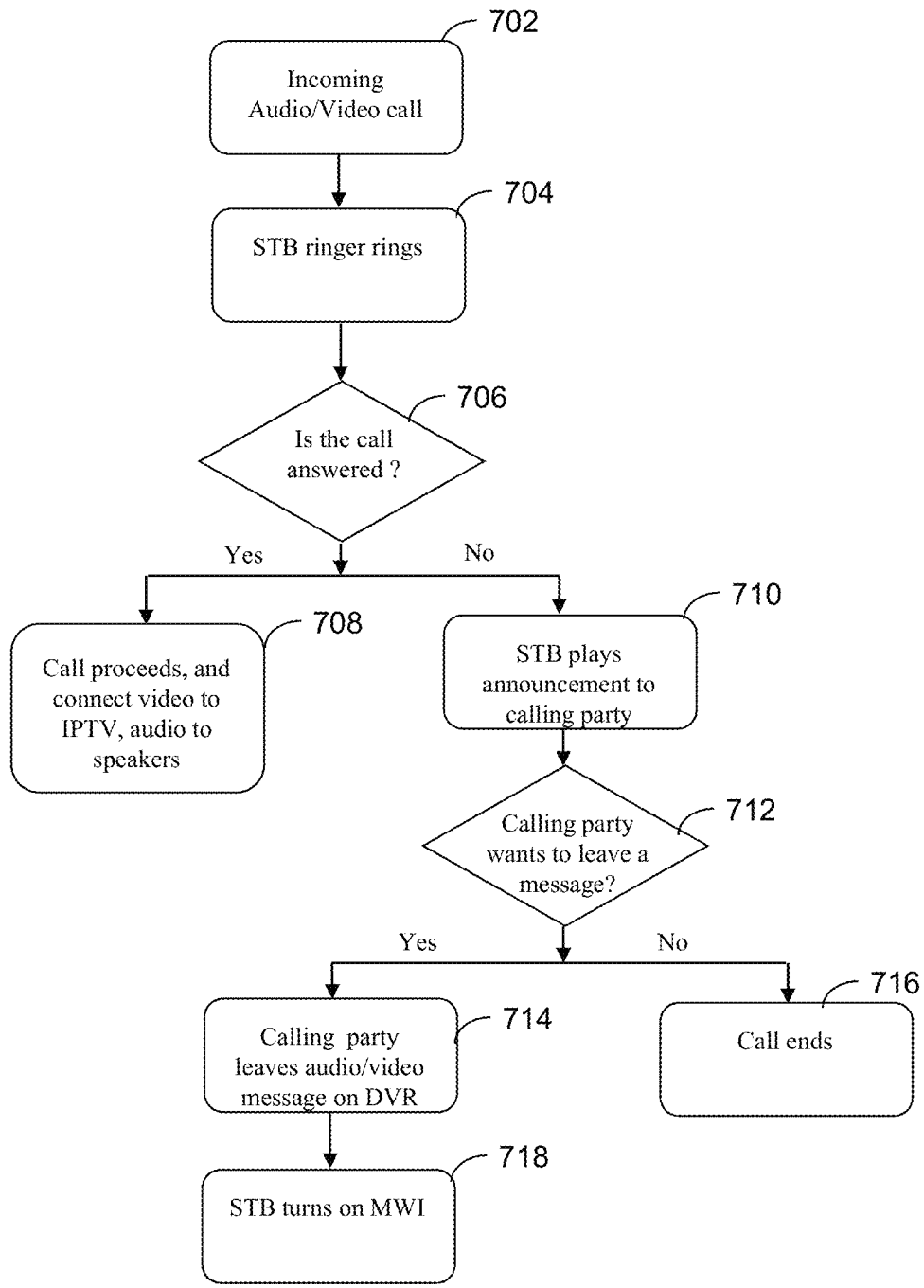
FIG. 7 depicts another illustrative embodiment of a method operating in portions of the communication system of FIG. 1 or 6.

Referring to FIG. 7, a method 700 illustrates another method in accordance with the embodiments. The method can begin at 702 with an incoming Audio/Video call where the STB ringer at the called party rings at 704. At decision block 706, if the call is answered, the call at 708 proceeds and the video is coupled to the IPTV television set and the audio is coupled to the speakers. If an incoming audio/video call is not answered at 706, the STB's mailbox capability at the receiving end can be activated. The STB will play an announcement at 710 to the calling party, which can either be an audio-only message similar to what is played by an answering machine today, or an audio/video message which is played out on the calling party's TV/speaker system. At this point, the calling party is invited to leave a message at 712. If no message is left, then the call ends at 716. Alternatively, at 714, the calling party can then proceed with leaving an audio/video (or audio only) message on the called party's DVR. A flashing MWI (message waiting indication) LED on the STB can be one way to alert the customer at 718 that there is a new audio/video message in the mailbox on the DVR. The recorded audio/video message stored on the DVR can then be played out on the TV.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A digital recording device, comprising:
 a processor; and
 a memory that stores executable instructions that, when executed by the processor facilitate performance of operations comprising:
  recording media content received at a set-top box from a source television network;
  providing, by the set-top box, an alert responsive to an incoming call;
  in a first alternative responsive to the alert and the incoming call being answered by way of the set-top box, recording data associated with a calling party and a called party associated with a multimedia conference hosted by the set-top box according to an interactive television network protocol using voice-over-internet protocol and video over the source television network, wherein a video portion of the multimedia conference is presented by the set-top box at a display coupled to the set-top box, and wherein an audio portion of the multimedia conference is presented by the set-top box at speakers attached to one of the set-top box or the display;
  in a second alternative responsive to the alert and the incoming call being answered by way of a telephone coupled to the set-top box, presenting the audio portion of the multimedia conference at the telephone, without presenting the audio portion at the speakers and without presenting the video portion at the display; and
  in a third alternative responsive to the incoming call being unanswered, recording a multimedia call made to the set-top box through the source television network.

2. The digital recording device of claim 1, wherein the set-top box presents a multimedia greeting message stored at the digital recording device responsive to the incoming call being unanswered, and wherein the incoming call being answered comprises the incoming call being picked up by a cordless telephone and cordless phone base coupled to the set-top box.

3. The digital recording device of claim 1, wherein the set-top box comprises a message waiting indicator located on a front panel of the set-top box in response to recording multimedia calls made to the set-top box through the source television network, wherein the processor comprises a plurality of processors operating in a distributed processing environment.

4. The digital recording device of claim 1, wherein the set-top box enables the called party and the calling party to see and hear each other using microphones and cameras coupled to respective set-top boxes belonging to the called party and the calling party.

5. The digital recording device of claim 1, wherein the set-top box captures video using a camera coupled to the set-top box.

6. The digital recording device of claim 1, wherein recording the data comprises recording video and audio associated with the calling party using the digital recording device.

7. The digital recording device of claim 1, wherein the digital recording device belongs to one of the calling party, the called party, or both the calling party and the called party.

8. The digital recording device of claim 1, wherein the display is a television set coupled to the set-top box, and wherein the alert comprises a call indicator presented at the set-top box.

9. A method, comprising:
  recording, by a system comprising a processor, media content received at a media processor from a source television network;
  providing, by the system, an alert responsive to an incoming multimedia call;
  responsive to the incoming multimedia call being answered by way of the media processor, responsive to the alert, recording, by the system, data associated with a calling party and a called party associated with a multimedia conference hosted by the media processor according to an interactive television network protocol using voice-over-internet protocol and video over the source television network, wherein a video portion of the multimedia conference is presented at a display by the media processor, and wherein an audio portion of the multimedia conference is presented a by the media processor at speakers attached to one of the media processor or the display;
  responsive to the alert and the incoming multimedia call being answered by way of a communication device coupled to the media processor, presenting, by the system, the audio portion of the multimedia conference at the communication device, without presenting the audio portion at the speakers and without presenting the video portion at the display; and
  responsive to the incoming multimedia call being unanswered, recording, by the system, the incoming multimedia call made to the media processor through the source television network.

10. The method of claim 9, wherein the media processor presents a multimedia greeting message responsive to the incoming multimedia call being unanswered.

11. The method of claim 9, wherein the media processor comprises a message waiting indicator located on a front panel of the media processor in response to recording multimedia calls made to the media processor through the source television network.

12. The method of claim 9, wherein the media processor enables the called party and the calling party to see and hear each other using microphones and cameras coupled to respective media processors belonging to the called party and the calling party.

13. The method of claim 9, wherein the media processor captures video using a camera coupled to the media processor, and wherein the communication device comprises a telephone.

14. The method of claim 9, wherein recording the data comprises recording video and audio associated with the calling party using a digital recording device.

15. A machine-readable storage device, comprising executable instructions that, when executed by a processor, facilitate performance of operations, comprising:
  recording media content received from a source television network;
  providing an alert responsive to an incoming call;
  responsive to the incoming call being answered, recording data associated with a calling party and a called party associated with a multimedia conference hosted by a media processor according to an interactive television network protocol, wherein a video portion of the multimedia conference is presented at a display by the media processor, and wherein an audio portion of the multimedia conference is presented by the media processor at speakers coupled to the media processor;
  responsive to the alert and the incoming call being answered by way of a communication device coupled to the media processor, presenting the audio portion of the multimedia conference at the communication device, without presenting the audio portion at the speakers and without presenting the video portion at the display; and
  responsive to the incoming call being unanswered, recording a multimedia call made to the media processor through the source television network.

16. The machine-readable storage device of claim 15, wherein the media processor presents a multimedia greeting message responsive to the incoming call being unanswered, and wherein the processor comprises a plurality of processors operating in a distributed processing environment.

17. The machine-readable storage device of claim 15, wherein a multimedia greeting message is presented responsive to the incoming call being unanswered.

18. The machine-readable storage device of claim 15, wherein a message waiting indicator is provided in response to recording multimedia calls made through the source television network, and wherein the communication device comprises a telephone.

19. The machine-readable storage device of claim 15, wherein the media processor enables the called party and the calling party to see and hear each other using microphones and cameras coupled to respective media processors belonging to the called party and the calling party.

20. The machine-readable storage device of claim 15, wherein the media processor captures video using a camera coupled to the media processor.

* * * * *